US010534712B1

(12) United States Patent
Fan et al.

(10) Patent No.: US 10,534,712 B1
(45) Date of Patent: Jan. 14, 2020

(54) SERVICE LEVEL AGREEMENT BASED MANAGEMENT OF A PRE-CACHE MODULE (71) Applicant: Infinidat LTD., Herzliya (IL)

(72) Inventors: Qun Fan, Irvine, CA (US); Venu Nayar, San Jose, CA (US); Haim Helman, Los Gatos, CA (US)

(73) Assignee: INFINIDAT LTD., Herzliya (IL)

( * ) Notice: Subject to any disclaimer, the term of this patent is extended or adjusted under 35 U.S.C. 154(b) by 249 days.

(21) Appl. No.: 15/249,504

(22) Filed: Aug. 29, 2016

(51) Int. Cl.
G06F 12/08 (2016.01)
G06F 12/0831 (2016.01)
G06F 12/0893 (2016.01)
G06F 12/0873 (2016.01)
G06F 12/0871 (2016.01)

(52) U.S. Cl.
CPC ...... *G06F 12/0831* (2013.01); *G06F 12/0873* (2013.01); *G06F 12/0893* (2013.01); *G06F 12/0871* (2013.01); *G06F 2212/1024* (2013.01); *G06F 2212/604* (2013.01); *G06F 2212/621* (2013.01)

(58) Field of Classification Search
CPC ... G06F 12/08; G06F 12/0871; G06F 12/0873
See application file for complete search history.

(56) References Cited

U.S. PATENT DOCUMENTS

| | | | |
|---|---|---|---|
| 4,722,046 A * | 1/1988 | Kasrazadeh | G06F 9/3824 711/140 |
| 6,859,440 B1 * | 2/2005 | Sonti | H04W 74/0866 370/252 |
| 7,047,366 B1 * | 5/2006 | Ezra | G06F 12/0804 711/129 |
| 7,904,656 B1 * | 3/2011 | White | G06F 3/061 360/51 |
| 7,996,622 B1 * | 8/2011 | Toksvig | G06F 12/124 711/133 |
| 2004/0123180 A1 * | 6/2004 | Soejima | G06F 11/1084 714/5.1 |
| 2014/0310464 A1 * | 10/2014 | Chambliss | G06F 12/0804 711/119 |

(Continued)

*Primary Examiner* — Charles Rones
*Assistant Examiner* — Tian-Pong Chang (57) ABSTRACT A method for service level agreement (SLA) allocation of resources of a cache memory of a storage system, the method may include monitoring, by a control layer of the storage system, actual performances of the storage system that are related to multiple logical volumes; calculating actual-to-required relationships between the actual performances and SLA defined performances of the multiple logical volumes; assigning caching priorities, to different logical volumes of the multiple logical volumes; wherein the assigning is based on, at least, the actual-to-required relationships; and managing, based on at least the caching priorities, a pre-cache memory module that is upstream to the cache module and is configured to store write requests that (i) are associated with one or more logical volumes of the different logical volumes and (ii) are received by the pre-cache memory module at points in time when the cache memory is full; wherein the managing comprises transferring one or more write requests from the pre-cache memory module to the cache memory when the cache memory is not full.

15 Claims, 5 Drawing Sheets (56) References Cited

U.S. PATENT DOCUMENTS

2016/0182345 A1\* 6/2016 Herdrich ................. H04L 43/50
                                                                    709/224
2016/0241665 A1\* 8/2016 Covell .................... H04L 67/10

\* cited by examiner

SERVICE LEVEL AGREEMENT BASED MANAGEMENT OF A PRE-CACHE MODULE

BACKGROUND

A service-level agreement (SLA) assigned to a logical volume in a storage system defines the quality of service (QoS) that is guaranteed to the user of the logical volume and particularity defines the performance, such as: response time, number of I/O operations per second (TOPS), and throughput (megabytes per second).

Various logical volumes of a storage system may be assigned with different SLAs and thus different required performance. Usually, the various logical volumes share the same system resources, such as cache memory.

Data included in write requests directed to different logical volumes is generally cached in a cache memory and is referred to as "dirty data", until it is written to a permanent storage device (and becomes "clean data"). The space in the cache memory that is dedicated to dirty data (dirty data cache space) is limited in size. Generally, when the dirty data cache space is full with dirty data, new data to be written is suspended until other cached dirty data is safely written to the permanent storage and evicted from the cache. The suspended data enters the cache in a FIFO manner, upon cache eviction. Thus, suspended data enters the cache according to the order of its arrival time. Therefore, logical volumes that receive large bursts of write requests may consume cache resources on the expense of other logical volumes, regardless of their priority, level of performance or SLA conformity.

There is a need to control the entrance of data into the cache memory, in a manner that reflects the required performance defined in the SLA of the logical volumes and the actual performance.

SUMMARY

A method for service level agreement (SLA) allocation of resources of a cache memory of a storage system, the method may include monitoring, by a control layer of the storage system, actual performances of the storage system that are related to multiple logical volumes; calculating actual-to-required relationships between the actual performances and SLA defined performances of the multiple logical volumes; assigning caching priorities, to different logical volumes of the multiple logical volumes; wherein the assigning is based on, at least, the actual-to-required relationships; and managing, based on at least the caching priorities, a pre-cache memory module that is upstream to the cache module and is configured to store write requests that (i) are associated with one or more logical volumes of the different logical volumes and (ii) are received by the pre-cache memory module at points in time when the cache memory is full; wherein the managing may include transferring one or more write requests from the pre-cache memory module to the cache memory when the cache memory is not full.

The caching priorities determine transfer rates of write requests stored in the pre-cache memory module.

The method may include applying one or more cache coherency processes on the cache memory and not applying any cache coherency process on the pre-cache memory module.

The method may include sending a caching acknowledgement to a host computer that sent a write request, wherein the sending is only after the write request is cached in the memory cache.

The method may include destaging data units of a write request from the cache memory to a permanent storage layer of the storage system.

The assigning may include increasing a transfer rate of write requests associated with an underperforming logical volume of the multiple logical volumes, from the pre-cache memory module to the cache memory.

The assigning may include decreasing a transfer rate of write requests associated with an over-performing logical volume of the multiple logical volumes, from the pre-cache memory module to the cache memory.

The assigning of the caching priorities may also be based on previous actual performances of the storage system related to the multiple logical volumes.

The assigning may include decreasing a transfer rate of write requests associated with an over-performing logical volume of the multiple logical volumes instead of increasing a transfer rate of write requests associated with an underperforming logical volume of the multiple logical volumes.

The method may include calculating an effectiveness of an increment in a transfer rate of write requests associated with an underperforming logical volume of the multiple logical volumes.

The pre-cache memory module may include multiple queues and wherein the managing may include defining one or more dequeuing parameters based on, at least, the caching priorities.

The one or more dequeuing parameters may include a dequeuing rate.

The defining of the one or more dequeuing parameters may be further based on relationships between the multiple queues and the multiple logical volumes; wherein a given queue may be related with a given logical volume when the given queue stores a write request that may be associated with the given logical volume.

The method may include moving, between a plurality of queues of the multiple queues, write requests associated with a given logical volume in response to a change in the caching priority of the given logical volume.

A non-transitory computer readable medium that stores instructions that once executed by a control layer of a storage system cause the control layer of the storage system to execute the steps of monitoring actual performances of the storage system that are related to multiple logical volumes; calculating actual-to-required relationships between the actual performances and service level agreement defined performances of the multiple logical volumes; assigning caching priorities, to different logical volumes of the multiple logical volumes; wherein the assigning is based on, at least, the actual-to-required relationships; and managing, based on at least the caching priorities, a pre-cache memory module that is upstream to the cache module and is configured to store write requests that (i) are associated with one or more logical volumes of the different logical volumes and (ii) are received by the pre-cache memory module at points in time when the cache memory is full; wherein the managing may include transferring one or more write requests from the pre-cache memory module to the cache memory when the cache memory is not full.

A storage system that may include a control layer and a permanent storage layer; wherein the control layer is configured to monitor actual performances of the storage system that are related to multiple logical volumes; calculate actualto-required relationships between the actual performances and SLA defined performances of the multiple logical volumes; assign caching priorities, to different logical volumes of the multiple logical volumes; wherein the assigning is based on, at least, the actual-to-required relationships; and manage, based on at least the caching priorities, a pre-cache memory module that is upstream to the cache module and is configured to store write requests that (i) are associated with one or more logical volumes of the different logical volumes and (ii) are received by the pre-cache memory module at points in time when the cache memory is full; wherein the managing may include transferring one or more write requests from the pre-cache memory module to the cache memory when the cache memory is not full.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The following system, method and non-transitory computer readable medium monitor the actual performance of the storage system with regard to various logical volumes and uses the relation between the actual performance and the required performance as was defined in the SLA of the various volumes as a priority for using system resources. The actual-to-required performance relation dictates the priorities of the various volumes with regard to entering the cache memory.

Figure 3:
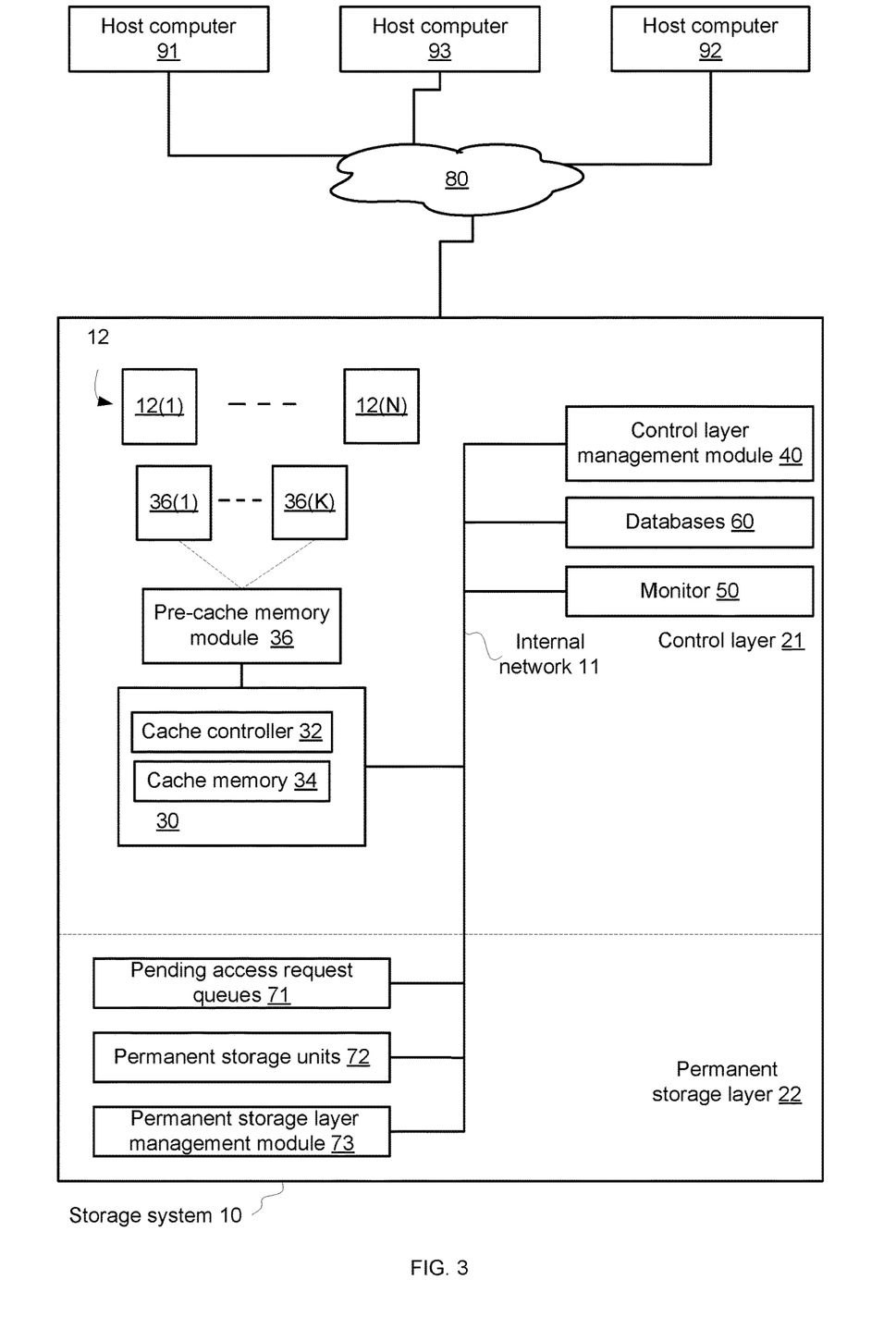
FIG. 3 illustrates a storage system, a network and multiple host computers according to an embodiment of the invention.

FIG. 3 illustrates storage system 10 according to an embodiment of the invention.

Storage system 10 may be a mass storage system that may store more than 10, 50, 100, 150, 200, 500, 1000 and even more terabytes.

Storage system 10 may be accessed by multiple computerized systems such as host computers 91, 92 and 93 that are coupled to storage system 10 over network 80. The computerized systems 91, 92 and 93 can read data from the storage system 10 and/or write data to the storage system 10.

Host computers 91, 92 and 93 may host multiple applications. Any number of computerized systems may be coupled to storage system 10 and any computerized system may host any number of applications.

Storage system 10 includes a control layer 21 and a permanent storage layer 22. Internal network 11 may couple different components of these layers to each other.

Permanent storage layer 22 is used to store data for any periods of time—including very long periods of time (days, months, years and the like).

Control layer 21 may receive access requests from the host computers, cache write requests and manage the access to the permanent storage layer 22.

Control layer 21 includes control layer management module 40, databases 60, monitor 50 and cache module 30.

Databases 60 may store metadata such as the SLA per each logical volume, actual-to-required relationships per logical volume, write requests to be cached in a cache memory of the control layer, history related to the logical volumes (pervious actual-to-required relationships per logical volume, pervious caching attempts to the cache memory, and the like).

Control layer management module 40 may include one or more processors and/or may be hosted by one or more processors. The control layer management module 40 may include at least one hardware component. The control layer management module 40 is configured to control accesses to permanent storage layer 22.

The cache module 30 may include cache controller 32, cache memory 34. The pre-cache module may be preceded by pre-cache memory module 36. Pre-cache memory module 36 may store data units that were received when cache memory 34 was not able to receive that data (for example—cache memory 34 was full), and this data is eventually sent to cache memory 34 when cache memory 34 is not full.

Pre-cache memory module 36 accommodates write requests that cannot be entered to the cache memory and may be of any configuration. For simplicity of explanation it is assumed that the pre-cache memory 36 includes multiple queues 36(1)-36(K), K being a positive integer that exceeds 1. Each queue may be associated with a certain caching priority. A queue may store write requests associated with one or more logical volumes. The caching priority assigned to a logical volume or a respective queue may be changed for that logical volume over time. The multiple queues are separate from the cache memory and structures thereof and may be stored in a different memory device.

Cache memory 34 can be used to temporarily store data received from computerized systems 91, 92 and 93 before the data is destaged to permanent storage layer 22 and for storing data that was read from permanent storage layer 22 and particularly, the most used data.

Internal network 11 facilitates communications between one or more components of permanent storage layer 22 and control layer 21. Internal network 11 may include passive and active components such as communication links, connectors, switches, routers and the like.

It is assumed that data units are stored in permanent storage layer 22, part of the data is stored in both permanent storage layer 22 and control layer 21 and some data is stored in control layer 21 and not stored in permanent storage layer (for example—dirty data that is temporally stored in cache memory 34. Data units related to write requests may be included in the write requests or may be separated from the write requests. It is assumed, for simplicity of explanation that the write requests include data units.

Cache memory 34 provides a faster access time and lower latency comparing to the access time and latency provided by the storage devices of permanent storage layer 22. Cache memory 34 may be a RAM or SSD.

Control layer 21 may include monitor 50 and data bases 60. Monitor 50 is configured to monitor the performances of the storage system 10—especially monitor the performance of the storage system regarding multiple logical volumes 12(1)-12(N)—collectively denoted 12.

Multiple logical volumes 12(1)-12(N) are virtual address spaces. One or more of these logical volumes are exposed to one or more of host computers 91, 92 and 93. Different host computers may be exposed to the same or different logical volumes. The term "exposed" means that a host computer may send access requests with logical addresses that are located within the logical volumes exposed to that host computer.

Storage system 10 may perform one or more conversions of the logical addresses and eventually stores data units in physical addresses of the permanent storage layer 22.

Permanent storage layer 22 includes pending access request queues 71, permanent storage units 72 and permanent storage layer management module 73.

Permanent storage units 72 may include one or more disks, one or more solid state drivers (SSDs) or any non-volatile storage units.

Pending access request queues 71 may store pending access requests that are sent to permanent storage layer 22 from control layer 21. Pending access request queues 71 may be queues that are handled internally by the hardware components of permanent storage layer 22, for example, each disk drive or each group of disk drives (e.g., enclosure) may handle its own internal queue.

Permanent storage layer management module 73 controls the operation of permanent storage layer 22. Alternatively, part or all the functionality of permanent storage layer management module 73 may be implemented by a module within control layer 21.

Control layer 21 may be prevented from directly affecting the manner in which the permanent storage layer 22 is controlled (e.g., the internal queues may not be accessed by control layer 21)—but may indirectly affect the manner that the permanent storage layer 22 is controlled—by controlling the access requests that are sent from control layer 21 to permanent storage layer 22.

Control layer management module 40 and monitor 50 may perform various steps of various methods illustrated in the patent application. It is noted that the various methods may be executed by a controller that differs from control layer management module 40 and that the controller may belong to storage system 10 or not belong to the storage system 10. For example—the actual performance of the volumes and calculating the actual-to-required performance of the volumes may be executed by the cache controller 32 and/or control layer management module 40 while the decisions relating to transferring access requests from the pre-cache memory module towards the cache memory can be made by a different controller.

Various logical volumes of the storage system can be associated with SLAs that define the required performance as defined by an administrator of the storage system for the sake of users of the storage system. The user may be a host computer, an application or any other program hosted by the host computer, and the like.

The required performance can be for example: minimum IOPS, minimum throughput, maximum response time, etc. The storage system may provide more than the minimum defined IOPS or throughput when the storage resources allow it. But when the resources are substantially loaded, providing more TOPS than required to a certain logical volume may result violation of the SLA of another logical volume.

The actual-to-required relationship may be determined to one or more logical volumes of the multiple logical volumes. An actual-to-required relationship of a given logical volume may be calculated by applying any formula on the actual performance of the storage system that is related to the given logical volume and an SLA defined performance of the storage system that is related to the given logical volume. Non-limiting example may include a ratio, a difference, and the like.

The actual performance is being monitored per logical volume constantly, periodically or upon certain events (e.g., upon completing serving a certain amount of TO requests). The actual performance is compared to the required performance of the logical volume, so as to provide actual-to-required performance relationship (will be also referred to as 'normalized performance'), which may be the division of the two (<actual performance>:<required performance>), a normalized difference ((<actual performance>-<required performance>)/<required performance>), or any other expression that represents the gap between the required performance and the actual performance.

The actual-to-required performance relation dictates the current priority that is assigned to the logical volume and the share of resources (such as cache memory module resources) that will be dedicated for serving access requests directed towards the logical volume—including write requests directed to the cache memory.

When the actual performance is much higher than the required performance, the priority is considered as low, and when the actual performance is much lower than the required performance, the priority is considered as high. The extent of the gap between the actual performance and the required performance can also influent the priority, so as to define multiple intermediate priorities.

An over-performing logical volume is a logical volume that performs better than the performance defined in the SLA and probably receives more resources than needed for conforming to the SLA. An under-performing logical volume is a logical volume that performs worse than the performance defined in the SLA and probably receives too low resources that do not allow it to conform to the SLA.

The actual-to-required performance relationships may change over time—and the tagging of a logical volumes volume as over-performing or under-performing also changes over time.

According to embodiments of the present invention, when the cache dirty data space (of the cache memory) is full so that new data cannot be entered immediately and should be postponed until older cached data is evicted from the cache, the pace in which new data enters the cache memory depends on the normalized performance of the logical volume towards which the new data is addressed. The normalized performance is constantly (or non-constantly) monitored and the aim is to increase the actual performance of each underperforming logical volume to at least the level of its required performance, by either: (i) gradually increasing the amount of new data of the under-performing logical volume that enters the cache per a time period; (ii) gradually decreasing the amount of new data of over-performing logical volumes that enters the cache, per the time period. The latter action will facilitate improving the performance of underperforming logical volumes when the former action does not improve the actual performance. Eventually, data that is addressed to a logical volume with a high normalized performance will enter the cache slower than data addressed to a logical volume of a lower normalized performance.

According to embodiments of the present invention, multiple queues hold the data units (write requests) that are waiting to enter the cache memory, when the cache memory is full.

Each queue of the multiple queues has a caching priority. A caching priority defines a priority of sending data units and/or write requests from the pre-cache module to the cache memory. At least two different queues have different caching priorities.

Each queue is for data units (write requests) of a certain caching priority that is defined according to the normalized performance associated with the logical volume towards which the data is destined. When new dirty data that is addressed towards a certain logical volume needs to enter the cache, and the cache is full, the new data is enqueued on a queue that was chosen for the logical volume towards which the data is addressed, according to the current normalized performance of the logical volume.

When some space is evicted from the dirty data cache space, data is dequeued from the queues (so as to enter the cache) according to the order of priority, wherein higher priority queues are dequeued faster than lower priority queues, so that higher priority data enters the cache before lower priority data.

According to an embodiment of the invention, the different pace of dequeueing (dequeuing rate) of data units from different queues can be implemented as follows.

Suppose there are eight queues, Q1, Q2, . . . Q8, wherein Q1 holds data units of the lowest priority, i.e., data units that are destined to the most performing logical volume (highest actual-to-required performance relation) and Q8 holds data units of the highest priority, i.e., data units that are destined to the least performing logical volumes (lowest actual-to-required performance relation).

Figure 1:
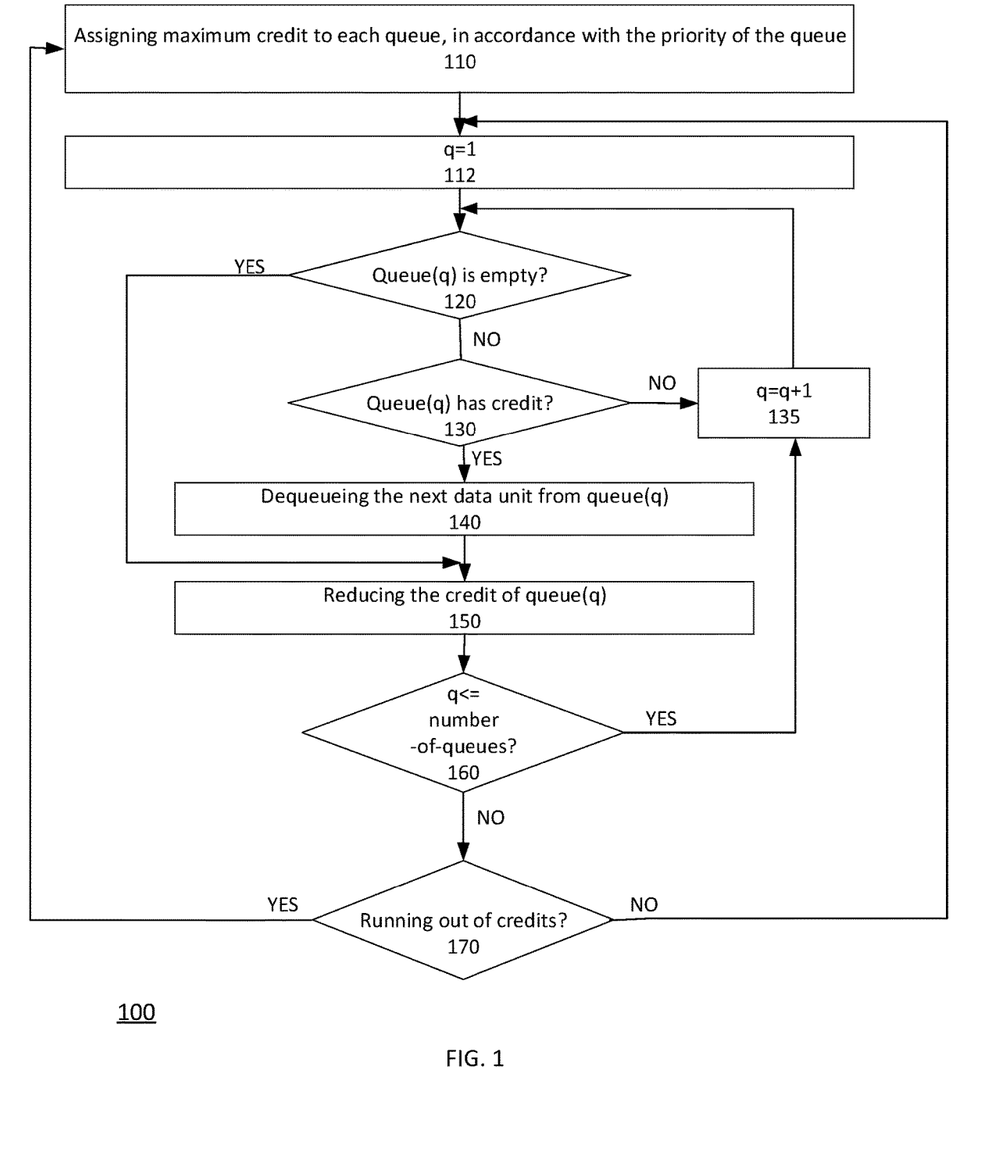
FIG. 1 illustrates a method according to an embodiment of the invention.

FIG. 1 illustrates an embodiment of steps for handling the multiple queues. Step 110 includes assigning a maximum credit to each queue, in accordance with the priority of the queue. The maximum credit represents how many data units can be dequeued from the queue for entering the cache, during a certain time period. For example, the maximum credits assigned to Q1 . . . Q8 may be: 1, 2, 4, 8, 16, 32, 64 and 128, respectively. Meaning that during the certain time period, 128 data units will be dequeued from the highest priority for caching, while only 1 data unit will be dequeued from the lowest priority for caching.

The process of dequeueing data units for writing them into the cache is done in a round-robin fashion, as illustrated by iterative steps: step 112 of assigning the value one to an iteration counter q, step 160 of checking whether all the queues were scanned and step 135 that increments the value of the iteration counter q if not all the queues were yet scanned.

If all queues have credit available, one data unit is dequeued from the top of each non-empty queue (Queue(q), step 140) on each round and the credit of the queue is decreased by one (step 150). If a queue runs out of credit (step 130), this queue is skipped and its dequeueing is stopped for the next iterations until the end of the certain time period, i.e., until all the queues consume their credit. If a queue has no queued data (i.e., the queue is empty, step 120), its credit is also decreased on its turn (step 150). So eventually, all the credit gets consumed for all the queues (170) and the process returns to re-assigning the maximum credit, as indicated by the arrow ("YES") connecting step 170 and 110.

During the certain time period that starts on step 110 until step 170 leads back to step 110, 128 data units were dequeued from the highest priority, 64 data units were dequeued from the next priority, and 1 data unit was dequeued from the lowest priority. The length of the certain time period may depend on the load of the system and on the rate of incoming write requests.

The example of FIG. 1 assumes that the logical volumes are distributed evenly across priorities and therefore, and also for the sake of simplicity of explanation, the maximum assigned credit is not dependent on the number of logical volumes per priority. Generally, this is not so, i.e., one priority may include more associated logical volumes than another priority, so that one queue handles more logical volumes than another. Therefore the number of maximum credit is also dependent on the number of logical volumes assigned to a queue. For example the number of maximum credits for the queues are: 1*<number-of-logical-in Q1>, 2*<number-of-logical-in Q2> . . . 128*<number-of-logical-in Q8>.

Figure 2:
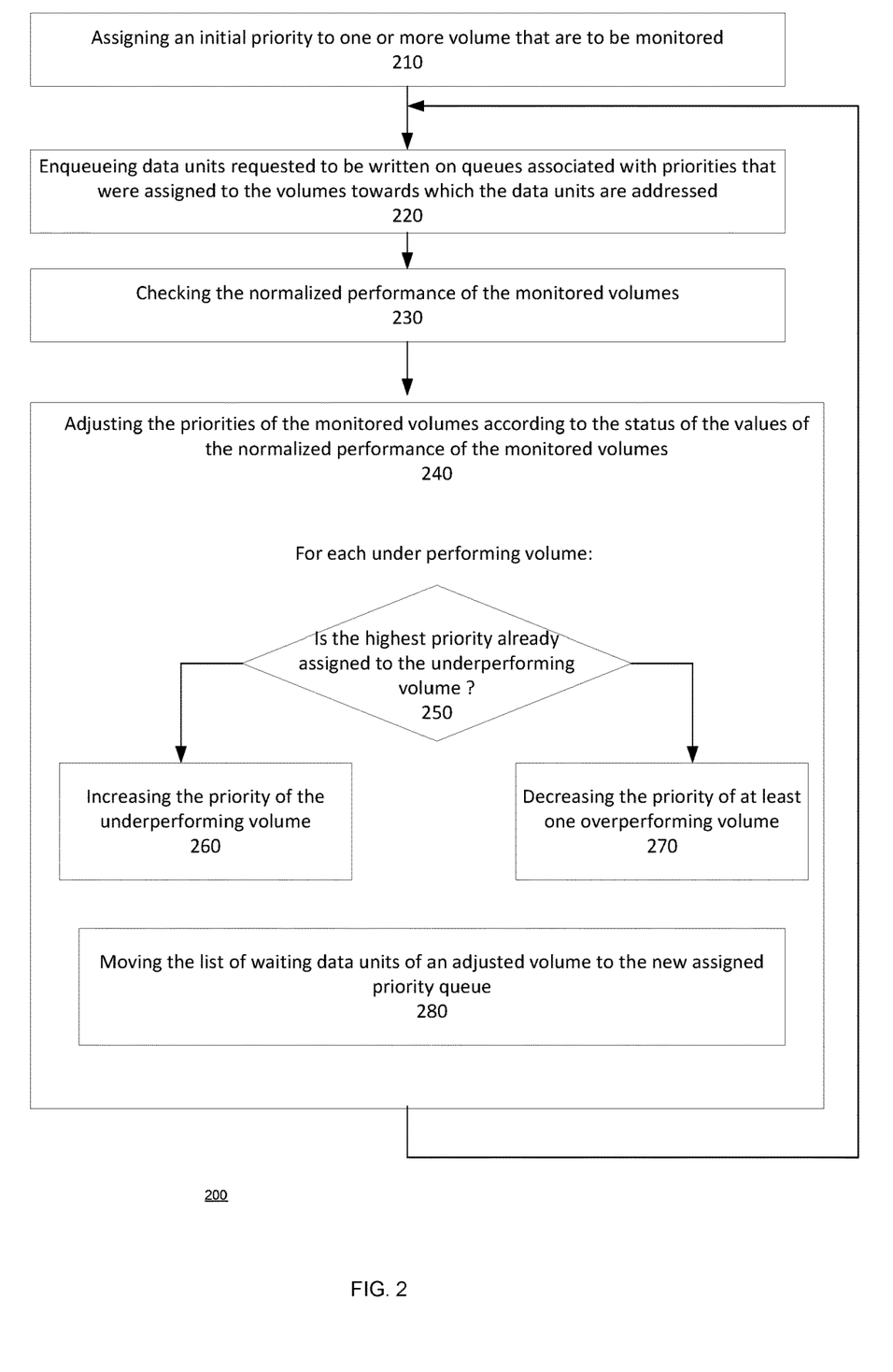
FIG. 2 illustrates a method according to an embodiment of the invention.

FIG. 2 illustrates steps for assigning priorities to logical volumes according to their normalized performance. The normalized performance in this example is calculated as the actual performance divided by the required performance, so that underperforming logical volumes have a normalized performance that is smaller than 1, while over-performing logical volumes have a normalized performance that is greater than 1.

Upon starting monitoring logical volume performance, e.g., upon system initialization or when an SLA is added to a logical volume, an initial priority is assigned to the monitored logical volume (s) (step 210), which may be a medium priority, for example 4 or 5 (when there are 8 priorities).

Step 220 includes enqueueing data units (requested to be written) on queues associated with priorities that were assigned to the logical volumes towards which the data units are addressed.

Step 230 includes checking the normalized performance of the monitored logical volumes. This step is performed periodically, e.g., every 20 seconds. Step 230 includes evaluating the actual performance of each logical volume by e.g., monitoring the number of requests served per second, calculating the latency, etc., and calculating the actual-to-required performance (normalized performance) according to the evaluated actual performance and the SLA-defined required performance. The calculating may include dividing the actual performance by the required performance.

Step 240 follows step 230 and includes adjusting the priorities of the monitored logical volumes according to the values of normalized performance of the monitored logical volumes. The aim is to raise the priorities (caching priorities) of underperforming logical volumes. Priorities of over-performing logical volumes are not adjusted if there are no underperforming logical volumes. Priorities of over-performing logical volumes are adjusted only if raising the priorities of underperforming logical volumes (occurred during pervious iterations) did not fix the underperformance state of the latter.

Step 240 includes steps 250, 260 and 270 that are performed to each of the underperforming logical volumes, e.g., logical volumes having a normalized performance that is below 1. If all the logical volumes performs at least as required, step 240 is skipped.

Step 250 includes determining whether the highest priority is already assigned to the underperforming logical volume. If not—step 260 is executed next and includes increasing the priority of the underperforming logical volume. The increasing may be changing the current priority by one level. For example: if the initial priority is 4 and the logical volume underperforms, then the priority will be increased to 5, and may be further increased in the next iterations if the logical still underperforms, until it reaches the highest priority (or until the required performance is achieved).

If the underperforming logical volume has reached the highest priority, e.g. 8, then step 250 is followed by step 270, where the priority of at least one over-performing logical volume is decreased. The at least one over-performing logical volume that is chosen may be any logical volume with a high level of normalized performance (e.g., greater than 1), a logical volume of the highest levels of normalized performance among other over-performing logical volumes, or may be a logical volume of lowest SLA requirement.

Step 240 further includes step 280 for each logical volume whose priority has been adjusted in steps 260 or 270. Step 280 includes moving the list of waiting data units that corresponds to the logical volume, from the old queue to the new queue according to the adjusted priority.

After adjusting the priorities of the monitored logical volumes, step 220, of enqueueing data units on the queues, is performed according to the adjusted priorities.

Figure 4:
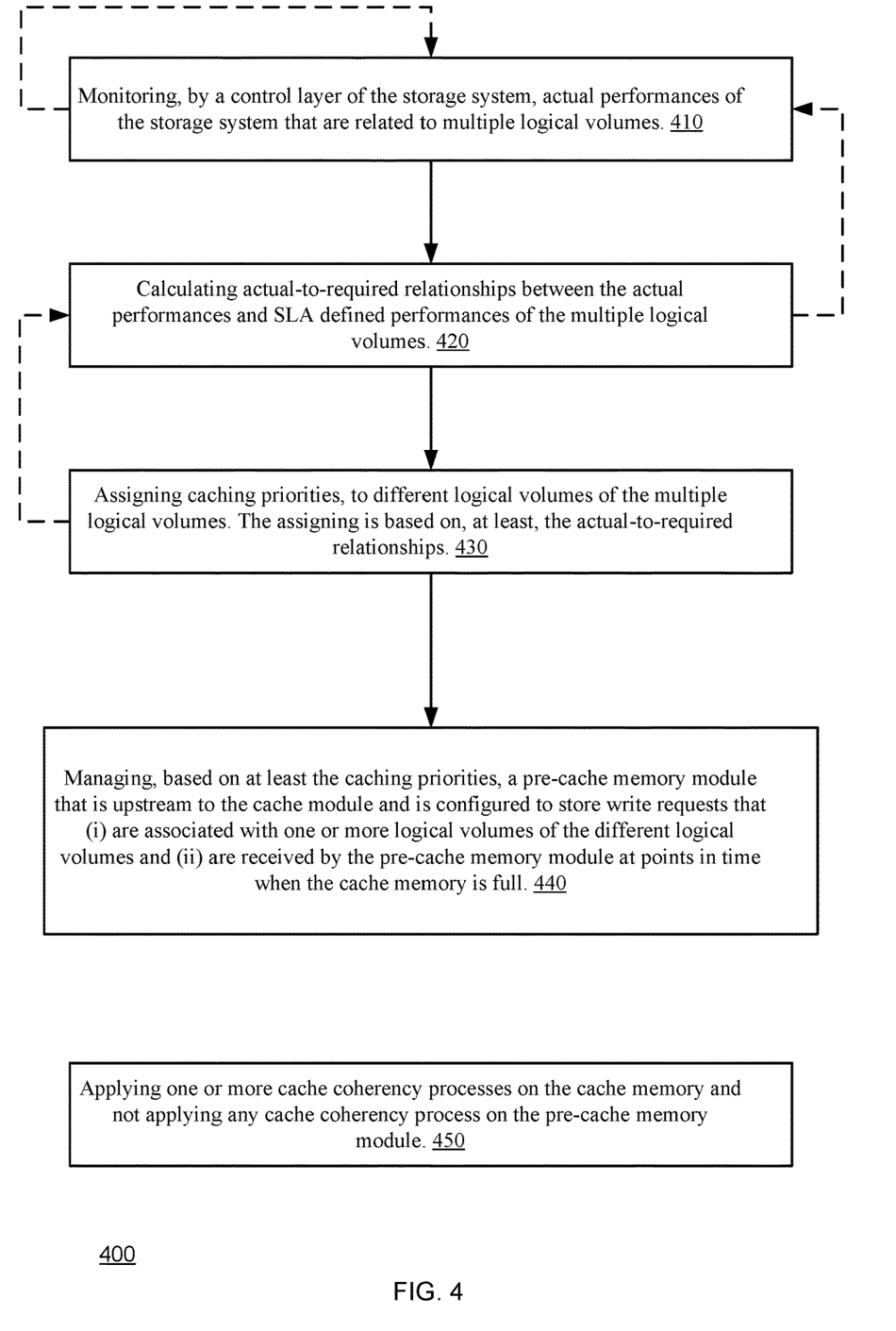
FIG. 4 illustrates a method according to an embodiment of the invention.

FIG. 4 illustrates method 400 for service level agreement (SLA) allocation of resources of a cache memory of a storage system, according to an embodiment of the invention.

Method 400 may start by step 410 of monitoring, by a control layer of the storage system, actual performances of the storage system that are related to multiple logical volumes.

Step 410 may be followed by step 420 of calculating actual-to-required relationships between the actual performances and SLA defined performances of the multiple logical volumes.

Step 420 may be followed by step 430 of assigning caching priorities, to different logical volumes of the multiple logical volumes. The assigning is based on, at least, the actual-to-required relationships.

Method 400 may also include step 440 of managing, based on at least the caching priorities, a pre-cache memory module that is upstream to the cache module and is configured to store write requests that (i) are associated with one or more logical volumes of the different logical volumes and (ii) are received by the pre-cache memory module at points in time when the cache memory is full.

Step 440 may include transferring one or more write requests from the pre-cache memory module to the cache memory when the cache memory is not full.

The caching priorities may determine transfer rates of write requests stored in the pre-cache memory module.

Method 400 may also include step 450 of applying one or more cache coherency processes on the cache memory and not applying any cache coherency process on the pre-cache memory module. The cache coherency processes may monitor the arrival of write requests to the cache module but may not monitor the reception of any write requests to the pre-cache module.

Step 450 may include sending a caching acknowledgement to a host computer that sent a write request only after the write request is cached in the cache memory, e.g., the caching acknowledgement is sent after transferring the write request from the pre-cache memory module to the cache memory.

Figure 5A:
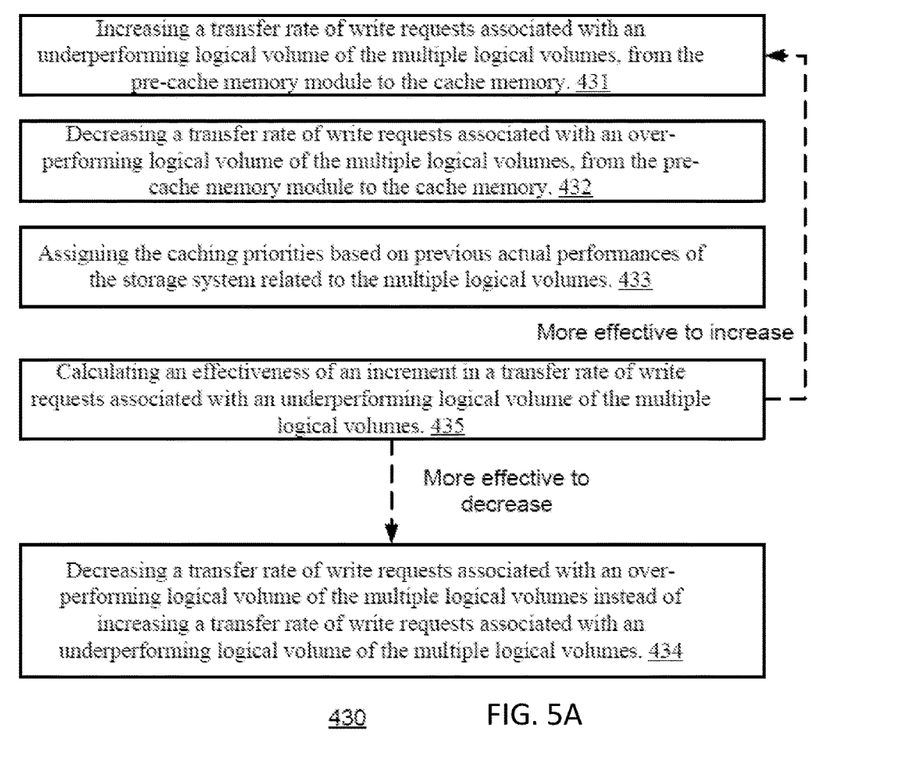
FIGS. 5A and 5B illustrates various steps of the method of FIG. 4 according to an embodiment of the invention.

Step 430 may include at least one of steps 431, 432, 433 and 435 (these steps are shown in FIG. 5A).

Step 430 may include setting a transfer rate of a queue according to the actual-to-required relation of the logical volume related to the logical volume.

Step 431 may include increasing a transfer rate of write requests associated with an underperforming logical volume of the multiple logical volumes, from the pre-cache memory module to the cache memory.

Step 432 may include decreasing a transfer rate of write requests associated with an over-performing logical volume of the multiple logical volumes, from the pre-cache memory module to the cache memory.

Step 433 may include assigning the caching priorities based on previous actual performances of the storage system related to the multiple logical volumes.

The assigning may try to find whether there is a relationship between the previously assigned caching priorities and previous actual performances (actual-to-required-relationships) related to the logical volume. For example—if previous increments of the caching priorities (above a predefined value) did not improve the actual-to-required-relationships than the assigning may include preventing from allocating more than the predefined value. The allocating may find the best or a sub-optimal assignment that will provide an optimal, maximal or suboptimal of overall actual-to-required-relationships.

Step 434 may include decreasing a transfer rate of write requests associated with an over-performing logical volume of the multiple logical volumes instead of increasing a transfer rate of write requests associated with an underperforming logical volume of the multiple logical volumes.

Step 435 may include calculating an effectiveness of an increment in a transfer rate of write requests associated with an underperforming logical volume of the multiple logical volumes. The effectiveness may represent the improvement of the actual-to-required relationship as a result of an increment in the transfer rate.

Figure 5B:
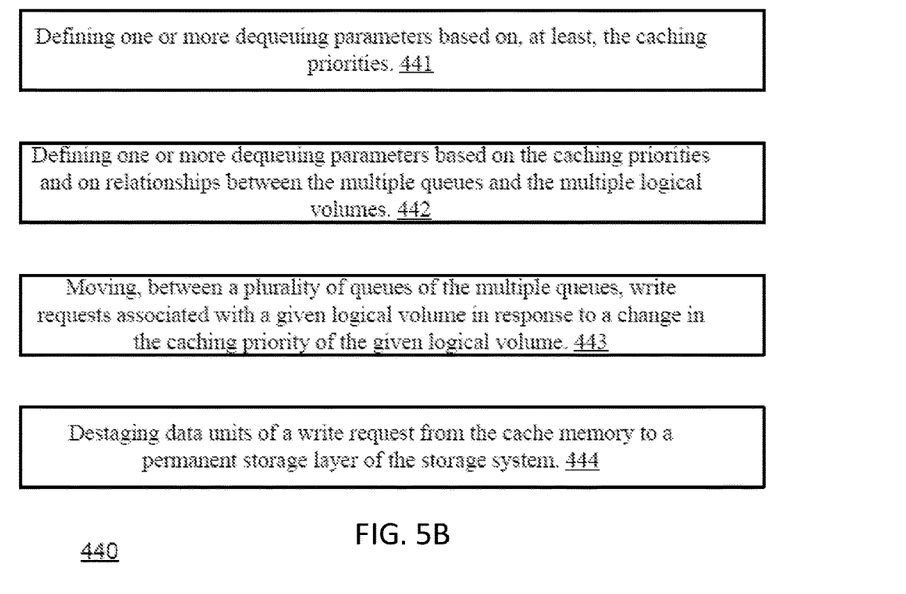

The pre-cache memory module may include multiple queues and step 440 may include at least one of steps 441, 442, 443 and 444 (these steps are shown in FIG. 5B).

Step 441 may include defining one or more dequeuing parameters based on, at least, the caching priorities.

The one or more dequeuing parameters may include a dequeuing rate.

A given queue is related with a given logical volume when the given queue stores a write request that is associated with the given logical volume. A given queue may be related to multiple logical volumes and stores write requests associated with the multiple logical volumes. Step 442 may include defining one or more dequeuing parameters based on the caching priorities and on relationships (which queue is related to which logical volume) between the multiple queues and the multiple logical volumes. A queue that is related with more logical volumes (that another logical volume) may be assigned with a higher dequeuing rate or any other dequeuing parameter that will guarantee a faster dequeuing rate.

Step 443 may include moving, between a plurality of queues (for example—two queues) of the multiple queues, write requests associated with a given logical volume in response to a change in the caching priority of the given logical volume. If, for example (a) a first queue is associated with a first caching priority (first dequeuing rate), (b) a second queue is associated with a second caching priority (second dequeuing rate), (c) write requests associated with a given logical volume were (during a first time period) associated with the first caching priority—and stored in the first queue, (d) a change in the actual-to-required relationships of the given logical volume occurred after the first time period (or near the end of the first time period) and caused the given logical volume to be assigned with the second caching priority, then—(e) the write requests associated with the given logical volume are transferred to the second queue.

Additionally or alternatively, instead of moving the write requests between the plurality of queues, step 443 may include changing metadata (such as pointers, descriptors) that will change the linkage between the write requests and the queues.

Step 444 may include destaging data units of a write request from the cache memory to a permanent storage layer of the storage system. Data units are not destaged to the permanent storage layer, directly from the pre-cache memory module.

The previous text referred to logical volumes but is applicable to any combination or logical address ranges.

Any reference to the terms "comprising", "comprises", "comprise", "including", "include" may also be treated as a reference to "consisting" and/or "consisting essentially of".

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (TO) devices. When executing the computer program, the computer system processes information according to the computer program and produces resultant output information via IO devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for service level agreement (SLA) allocation of resources of a cache memory of a storage system, the method comprises:
    monitoring, by a control layer of the storage system, actual performances of the storage system that are related to multiple logical volumes;
    calculating actual-to-required relationships between the actual performances and SLA defined performances of the multiple logical volumes;
    assigning caching priorities, to different logical volumes of the multiple logical volumes; wherein the assigning is based on, at least, the actual-to-required relationships; and
    managing, based on at least the caching priorities, a pre-cache memory module that is upstream to the cache module and is configured to store write requests that (i) are associated with one or more logical volumes of the different logical volumes and (ii) are received for caching at points in time when the cache memory is full; wherein the managing comprises transferring one or more write requests from the pre-cache memory module to the cache memory when the cache memory is not full, wherein different caching priorities determine different transfer rates from the pre-cache memory module into the cache memory, of write requests stored in the pre-cache memory module.

2. The method according to claim 1 comprising applying one or more cache coherency processes on the cache memory and not applying any cache coherency process on the pre-cache memory module.

3. The method according to claim 1 comprising sending a caching acknowledgement to a host computer that sent a write request, wherein the sending is only after the write request is cached in the memory cache.

4. The method according to claim 1 comprising destaging data units of a write request from the cache memory to a permanent storage layer of the storage system.

5. The method according to claim 1 wherein the assigning comprises increasing a transfer rate of write requests associated with an underperforming logical volume of the multiple logical volumes, from the pre-cache memory module to the cache memory.

6. The method according to claim 1 wherein the assigning of the caching priorities is also based on previous actual performances of the storage system related to the multiple logical volumes.

7. The method according to claim 1 comprising calculating an effectiveness of an increment in a transfer rate of write requests associated with an underperforming logical volume of the multiple logical volumes.

8. The method according to claim 1 wherein the pre-cache memory module comprises multiple queues and wherein the managing comprises defining one or more dequeuing parameters based on, at least, the caching priorities.

9. The method according to claim 1 comprising calculating an effectiveness of an increment in a transfer rate of write requests associated with an underperforming logical volume of the multiple logical volumes; wherein the assigning comprises decreasing a transfer rate of write requests associated with an over-performing logical volume of the multiple logical volumes, from the pre-cache memory module to the cache memory.

10. The method according to claim 1 comprising calculating an effectiveness of an increment in a transfer rate of write requests associated with an underperforming logical volume of the multiple logical volumes; wherein the assigning comprises decreasing a transfer rate of write requests associated with an over-performing logical volume of the multiple logical volumes instead of increasing a transfer rate of write requests associated with an underperforming logical volume of the multiple logical volumes.

11. The method according to claim 8 wherein the one or more dequeuing parameters comprise a dequeuing rate.

12. The method according to claim 8 wherein the defining of the one or more dequeuing parameters is further based on relationships between the multiple queues and the multiple logical volumes; wherein a given queue is related with a given logical volume when the given queue stores a write request that is associated with the given logical volume.

13. The method according to claim 8 comprising moving, between a plurality of queues of the multiple queues, write requests associated with a given logical volume in response to a change in the caching priority of the given logical volume.

14. A non-transitory computer readable medium that stores instructions that once executed by a control layer of a storage system cause the control layer of the storage system to execute the steps of:
  monitoring actual performances of the storage system that are related to multiple logical volumes;
  calculating actual-to-required relationships between the actual performances and service level agreement defined performances of the multiple logical volumes;
  assigning caching priorities, to different logical volumes of the multiple logical volumes; wherein the assigning is based on, at least, the actual-to-required relationships; and
  managing, based on at least the caching priorities, a pre-cache memory module that is upstream to the cache module and is configured to store write requests that (i) are associated with one or more logical volumes of the different logical volumes and (ii) are received for caching at points in time when the cache memory is full; wherein the managing comprises transferring one or more write requests from the pre-cache memory module to the cache memory when the cache memory is not full, wherein different caching priorities determine different transfer rates from the pre-cache memory module into the cache memory, of write requests stored in the pre-cache memory module.

15. A storage system that comprises a control layer and a permanent storage layer; wherein the control layer is configured to monitor actual performances of the storage system that are related to multiple logical volumes; calculate actual-to-required relationships between the actual performances and SLA defined performances of the multiple logical volumes; assign caching priorities, to different logical volumes of the multiple logical volumes; wherein the assigning is based on, at least, the actual-to-required relationships; and manage, based on at least the caching priorities, a pre-cache memory module that is upstream to the cache module and is configured to store write requests that (i) are associated with one or more logical volumes of the different logical volumes and (ii) are received for caching at points in time when the cache memory is full; wherein the managing comprises transferring one or more write requests from the pre-cache memory module to the cache memory when the cache memory is not full, wherein different caching priorities determine different transfer rates from the pre-cache memory module into the cache memory, of write requests stored in the pre-cache memory module.

\* \* \* \* \*